(12) United States Patent
Glashow et al.

(10) Patent No.: US 7,890,984 B2
(45) Date of Patent: Feb. 15, 2011

(54) METHOD AND SYSTEM OF VIDEO ON DEMAND DATING

(75) Inventors: Rebecca Lee Glashow, Philadelphia, PA (US); Page Hamilton Thompson, Rosemont, PA (US); Matthew E. Strauss, Cherry Hill, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 578 days.

(21) Appl. No.: 11/719,044

(22) PCT Filed: Jun. 8, 2005

(86) PCT No.: PCT/US2005/020214

§ 371 (c)(1),
(2), (4) Date: Jun. 28, 2007

(87) PCT Pub. No.: WO2005/122581

PCT Pub. Date: Dec. 22, 2005

(65) Prior Publication Data

US 2008/0109860 A1    May 8, 2008

Related U.S. Application Data

(60) Provisional application No. 60/577,812, filed on Jun. 8, 2004.

(51) Int. Cl.
*H04N 7/173* (2006.01)

(52) U.S. Cl. .......................................... 725/87; 725/86
(58) Field of Classification Search .................. 725/32, 725/34, 37, 45, 87, 110; 705/1, 14; 709/1, 709/14
See application file for complete search history.

(56) References Cited

U.S. PATENT DOCUMENTS

| | | | |
|---|---|---|---|
| 5,986,690 A * | 11/1999 | Hendricks | 725/60 |
| 6,285,984 B1 * | 9/2001 | Speicher | 705/14.73 |
| 2002/0059621 A1 * | 5/2002 | Thomas et al. | 725/87 |
| 2002/0092019 A1 * | 7/2002 | Marcus | 725/37 |
| 2002/0120506 A1 * | 8/2002 | Hagen | 705/14 |
| 2003/0131355 A1 * | 7/2003 | Berenson et al. | 725/46 |
| 2004/0078809 A1 * | 4/2004 | Drazin | 725/34 |
| 2004/0122730 A1 * | 6/2004 | Tucciarone et al. | 705/14 |
| 2004/0143841 A1 * | 7/2004 | Wang et al. | 725/32 |
| 2005/0010950 A1 * | 1/2005 | Carney et al. | 725/45 |
| 2005/0050576 A1 * | 3/2005 | Upendran et al. | 725/110 |
| 2005/0060175 A1 * | 3/2005 | Farber et al. | 705/1 |
| 2006/0069749 A1 * | 3/2006 | Herz et al. | 709/219 |

* cited by examiner

*Primary Examiner*—Joseph P Hirl
*Assistant Examiner*—An Nguyen
(74) *Attorney, Agent, or Firm*—Banner & Witcoff, Ltd.

(57) ABSTRACT

Method and system of video on demand (VOD) dating. The method and system permitting a user to select video personals for on demand view. The video personal include recordings of individual interviews or other activities which may be used to introduce the individual to the user and/or to otherwise facilitate dating.

8 Claims, 4 Drawing Sheets

METHOD AND SYSTEM OF VIDEO ON DEMAND DATING

CROSS-REFERENCE TO RELATED APPLICATIONS

This application claims the benefit of U.S. provisional application Ser. No. 60/577,812 filed Jun. 8, 2004, the disclosure of which is hereby incorporated in it entirety.

BACKGROUND OF THE INVENTION

1. Field of the Invention

The present invention relates to methods and system of video on demand (VOD) dating.

2. Background Art

Dating is made increasingly difficult today by the busy lives people lead. It is often difficult for one individual to meet another individual having desired interests and personal characteristics.

Various systems exist that facilitate social interaction between people. The "personals" section of newspapers and magazines has been a long time source of advertisements placed by people who would like to meet others with similar likes and interests. However, personal ads only allow an individual to specify limited criteria desired in another person due to the space constraints of the advertisement. Also, should others respond to the advertisement, the individual will have little, if any, information about the responder.

Personal advertisement services have now migrated to the Internet, wherein these dating services allow each user to select a set of criteria that they wish to be met by another user. Internet dating services match people using a database having a profile for each user, where each user's profile contains personal information such as gender, age, physical attributes (height, weight, eye and hair color, etc.), education, interests, etc. Information on one or more suitable candidates are provided to the user based upon his/her requested criteria, where this information can include a picture of each candidate.

SUMMARY OF THE INVENTION

One aspect of the present invention relates to a method of providing video on demand (VOD) dating. The method may include storing a number of video personals on a VOD server, determining a subscriber demanding viewing of one or more of the video personals, and selectively transmitting signals associated with the one or more demanded video personals to the demanding subscriber such that the one or more demanded video personals are viewable by the demanding subscriber to facilitate VOD dating.

The method may further include storing the number of video personals on a VOD server associated with a cable television system provider.

The method may further include providing a video personals menu to the demanding subscriber to facilitate playback of the one or more video personals. VOD navigation features may be included with the video personals menu, such as to facilitate controlling playback of the one or more video personals and/or to facilitate contacting individuals associated with the one or more video personals, such as by sending a message to one or more of the individuals.

The method may further include receiving self-produced and/or professionally produced video personals from one or more individuals and storing the self-produced video personals on the VOD server. For example, recording events may be staged to facilitate professionally producing the video personals and/or professional recording equipment may be provided.

The method may further include providing a number of personal questions to individuals associated with the video personals and including responses of the individuals to the questions within the video personals.

The method may further include providing a VOD dating menu to facilitate demanding the video personals. The VOD dating menu may be accessible through a VOD menu provided to subscribers by a cable television provider. The VOD dating menu may include number of selectable categories within the VOD dating menu, each of the selectable categories may be selectable for on demand viewing of video personals associated with therewith, such as a view all men or woman category within the VOD dating menu, a view all men or women within a predefined age range category within the VOD dating menu, and/or a single scenes category within the VOD dating menu.

The method may further include displaying a listing menu in response to selection of one or the categories. The listing menu may display a number of selectable video personals associated with the selected category. The video personals may be individually selected to play the video personal associated therewith. A indicator may be include for one or more of the video personals in the listing menu to indicate whether the subscribe has previously viewed the associated video personal, such as by indicating whether the video personal associated therewith is new.

One non-limiting aspect of the present invention relates to a system of providing video on demand (VOD) dating. The system may include a VOD server configured to store video and video personals and one or more settop boxes (STBs) configured to communicate with the VOD server. The video and video personals may be available for on demand transport to one or more users and the STBs may include capabilities for selectively demanding video or video personals stored on the VOD server and capabilities for playing the demanded video or video personals. The system may further include a cable television network for communicating signals between the VOD server and the STBs to facilitate selection and playback of the video and video personals. The VOD server is configured to arrange multiple video personals for playback by the STBs, wherein the multiple video personals are played in successive order.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
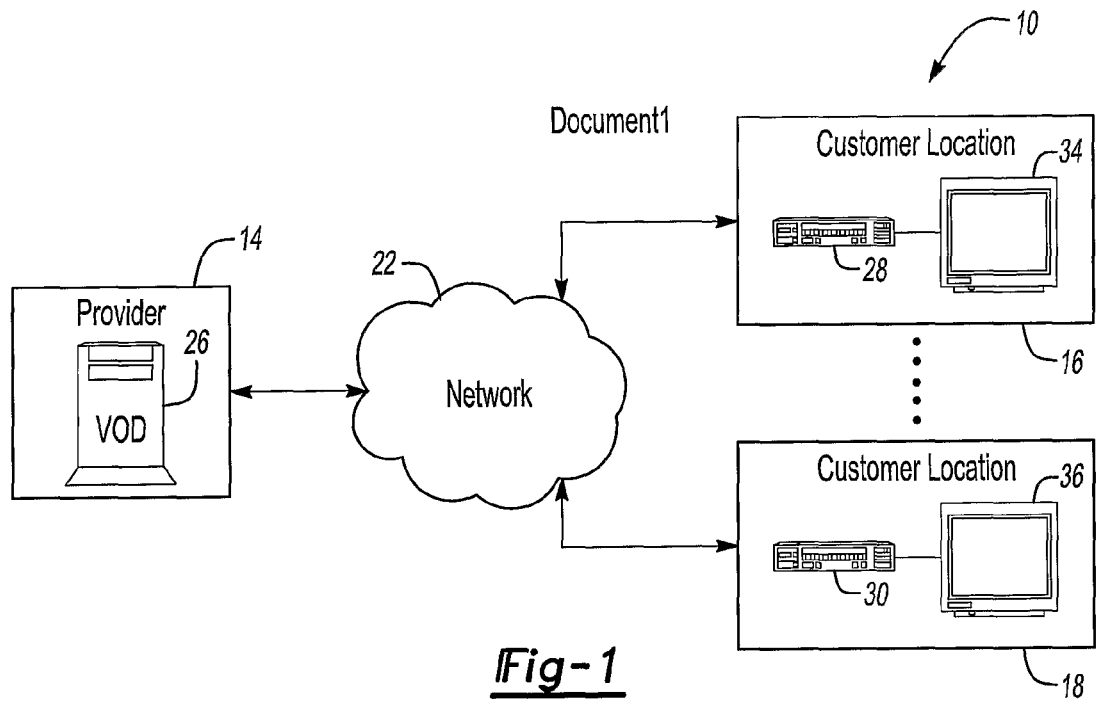
FIG. 1 illustrates a VOD dating system in accordance with one non-limiting aspect of the present invention.

FIG. 1 illustrates a system 10 of providing video on demand (VOD) dating in accordance with one non-limiting aspect of the present invention. The system 10 generally relates to any environment where a service provider 14 provides services to one or more customer locations 16-18 through signals communicated over a network 22.

The services may relate to any number of services, including cable television, high-speed data, broadcast television, and other services. The provider 14 may be a cable television provider, satellite television provider, or other similar service provider. The network 22 may be any terrestrial or extraterrestrial, wireless or wireline network suitably configured to transport signals according to any number of protocols, formats, and operating systems.

The provider 14 may include a VOD server 26 for storing video and video personals. The videos may be commonly available movies, programs, or other entertainment orientated programming, such as the type commonly available from movie and televisions studios. The video personals, as described below in more detail, may be recordings of individuals desiring to describe themselves for dating purposes.

The customer locations 16-18 may include any number of features to facilitate user interaction with the services associated with the provider 14. For example, if the provider 14 is associated with a cable system provider, the customer locations 16-18 may include a settop boxes (STBs) 28-30 and televisions 34-36. The STBs 28-30 may be configured to interact with the provider 14 and the user to provide services thereto. In more detail, the STBs 28-30 may be configured to decode or otherwise manipulate signals received from the provider 14 for playback on the televisions 34-36.

The STBs 28-30 may be further configured to display menus and other features on the televisions 34-36. A remote control (not shown) or other user operable device may be used to manipulate the menus. The menus may provide selectable features and other user interfaces to facilitate displaying information and receiving commands from the users. The STBs 28-30 may be configured to communicate with the provider as a function of the user inputs and/or as a function of signals received from the provider, such as a function of signals used to program, initialize, or otherwise configure the STBs 28-30.

Of course, the present invention fully contemplates the system 10 including more or less of these features and is not intended to be limited to the foregoing. For example, the STBs 28-30 and/or the functionality associated therewith may be integrated into the televisions 34-36 or other devices at the customer locations.

According to the present invention, video personals of a plurality of individuals are made available on one or more of the service provider's VOD server 26. Of course, the VOD implementation at the detailed level may take any suitable form. It is appreciated that the invention involves the bringing together of a dating approach with VOD architecture. The new use of VOD architecture provides an enhanced arrangement in which a dating system can transcend the historical limitations of personal ads and other existing approaches to dating.

The video personals may be about 3 to 5 minutes in length, and can be self-produced by the individuals themselves, or alternatively can be professionally produced, such as with a professional production crew and make-up artist and/or with equipment provided by the provider 14. Professionally produced videos may be preferred, as they will be of higher caliber than videos that might be available with current online dating services. The video personals could be filmed at an existing event or venue where people are gathering, such as a speed-dating party. In this approach to preparing the video personals, participants would be able to sign up for particular video-taping time slots in advance of the event. In creating the video personal, the participant may be asked unique sets of questions geared toward revealing more of their personality to viewers than could any standard personal advertisement (e.g. "Mad-lib" style, fill in the blank-type sentences relating to dating/single life, worst pick-up lines ever used or heard, funny stories, etc.).

Once filmed, the video personals are encoded, packaged, and stored on one or more VOD servers 14. A video personal can be appropriately placed on a single, local VOD server based upon matching the geographic location of the participant. Alternatively, a video personal could be placed on all VOD servers 14 for a national distribution. Video personals can have a limited lifetime on the VOD server 14, such as 8 weeks.

Figure 2A:
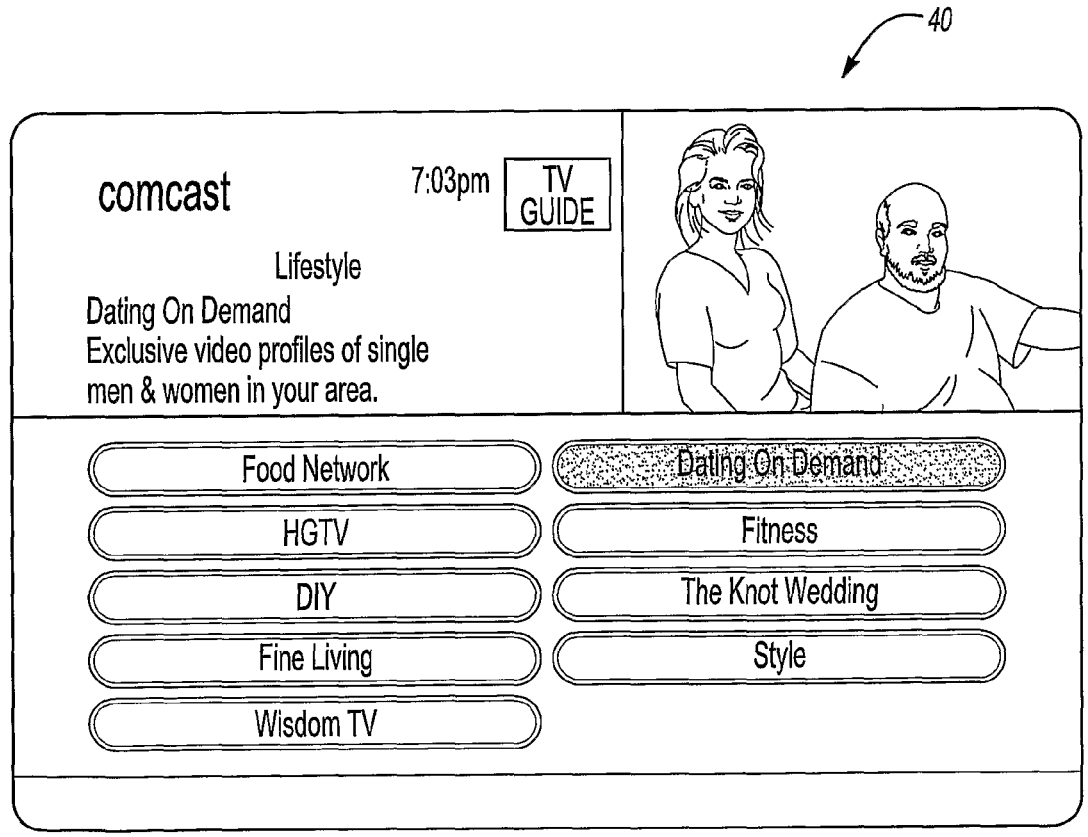
FIGS. 2A-2C illustrate a number of VOD menus through which VOD dating may be accessed in accordance with one non-limiting aspect of the present invention.
Figure 2B:
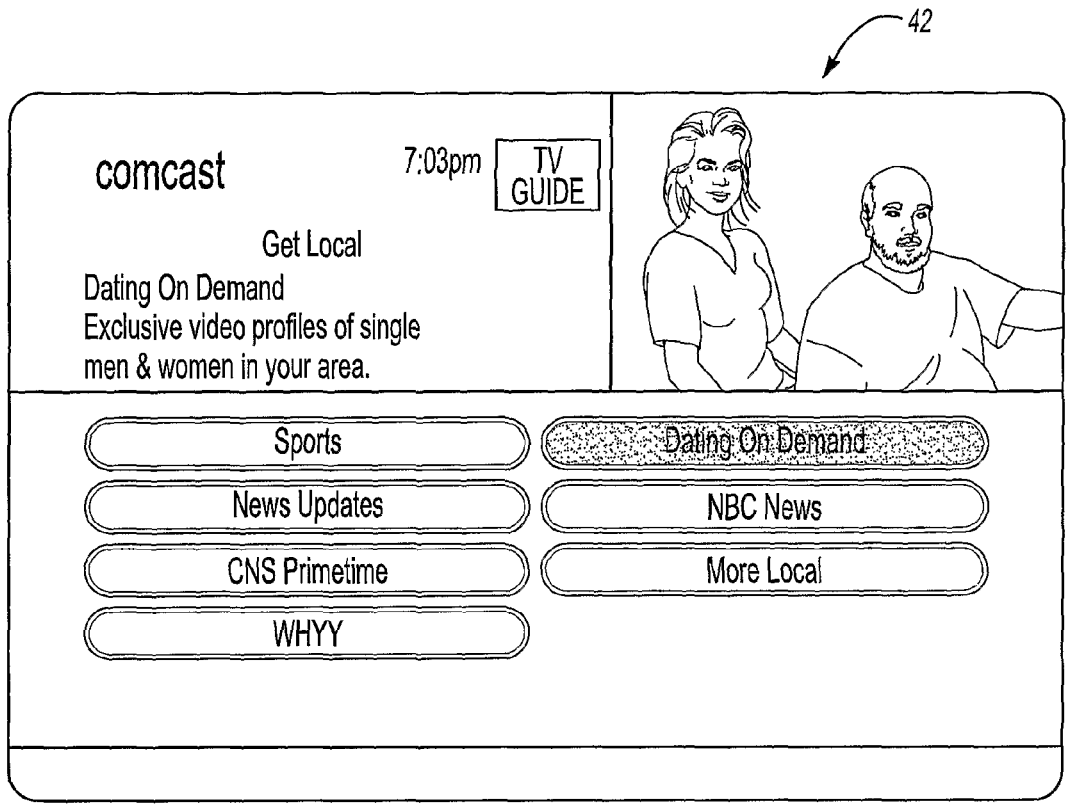
Figure 2C:
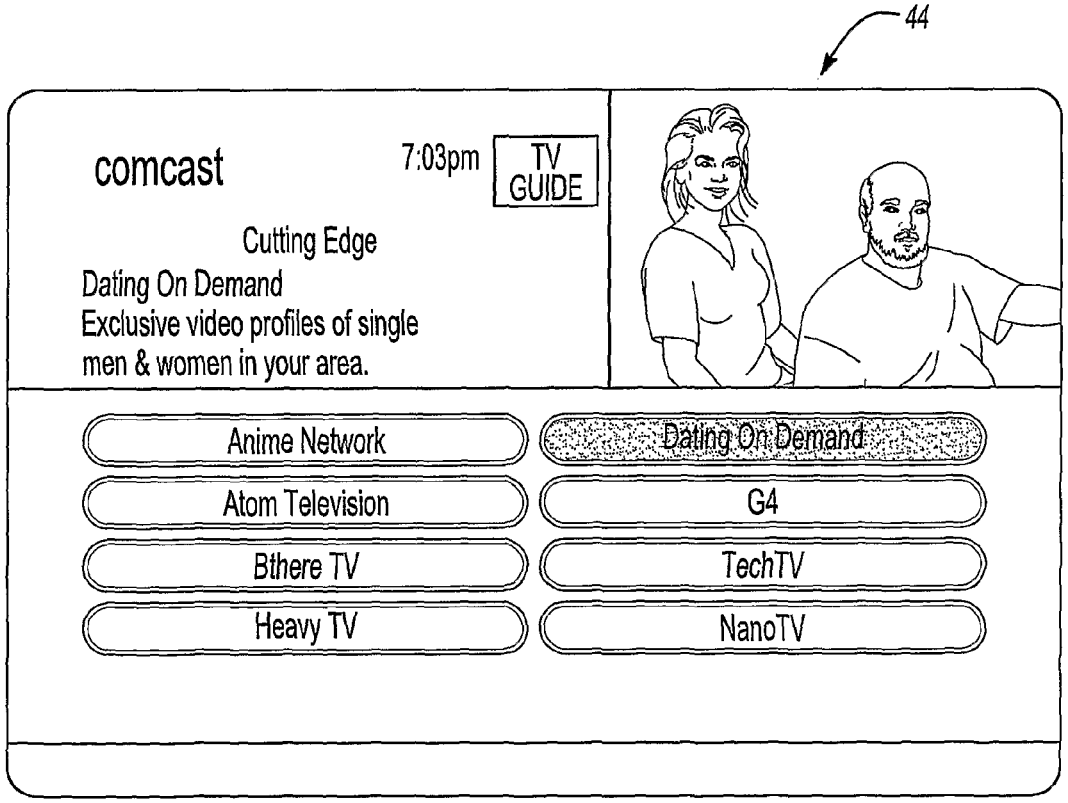

With reference to FIGS. 2A-C, the dating system (i.e., "Dating on Demand") according to the present invention can be accessible by VOD subscribers under one or more menu categories associated a VOD system. The VOD system may be associated, for example, with VOD systems commonly associated with cable system providers and the menus and user interfaces used to access such systems from the customer locations. For example, subscribers could access the video personals and related video segments via a "Lifestyle" menu (FIG. 2A) 40, a "Get Local" menu (FIG. 2B) 42, a "Cutting Edge" menu (FIG. 2C) 44, or others.

Figure 3:
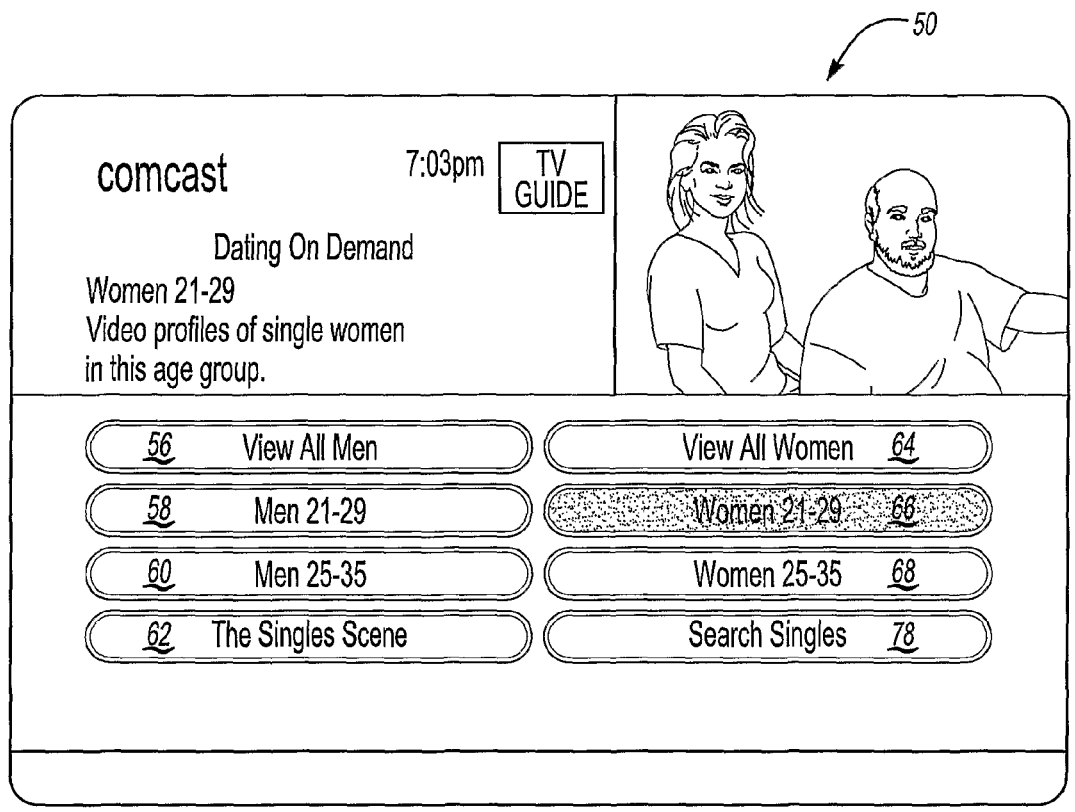
FIG. 3 illustrates a VOD dating menu in accordance with one non-limiting aspect of the present invention.

Once "Dating on Demand" is selected via one of the menus depicted in FIG. 2, a VOD dating menu 50 may be displayed, as shown in FIG. 3. The menu 50 may be sued to select video personals from a number of specified categories 56-68. For example, upon selection of the "Women 21-29" category 66, a listing menu 74 such as that illustrated in FIG. 4 may be presented. Of course, it is understood that the category options 56-68 shown in FIG. 3 are merely exemplary, and that the video personals could be divided into many other categories based upon criteria such as residence location, physical attributes, education, likes and dislikes, and many more.

Furthermore, a search option 78 could also be incorporated in the category menu of FIG. 3 or on a separate screen, such that a subscriber could enter specific search criteria in order to customize the sorting and categorizing of video personals. Multiple search criteria could be specified by the subscriber and prioritized, such that video personals would be compiled in a particular order depending upon how well the search criteria are met.

Figure 4:
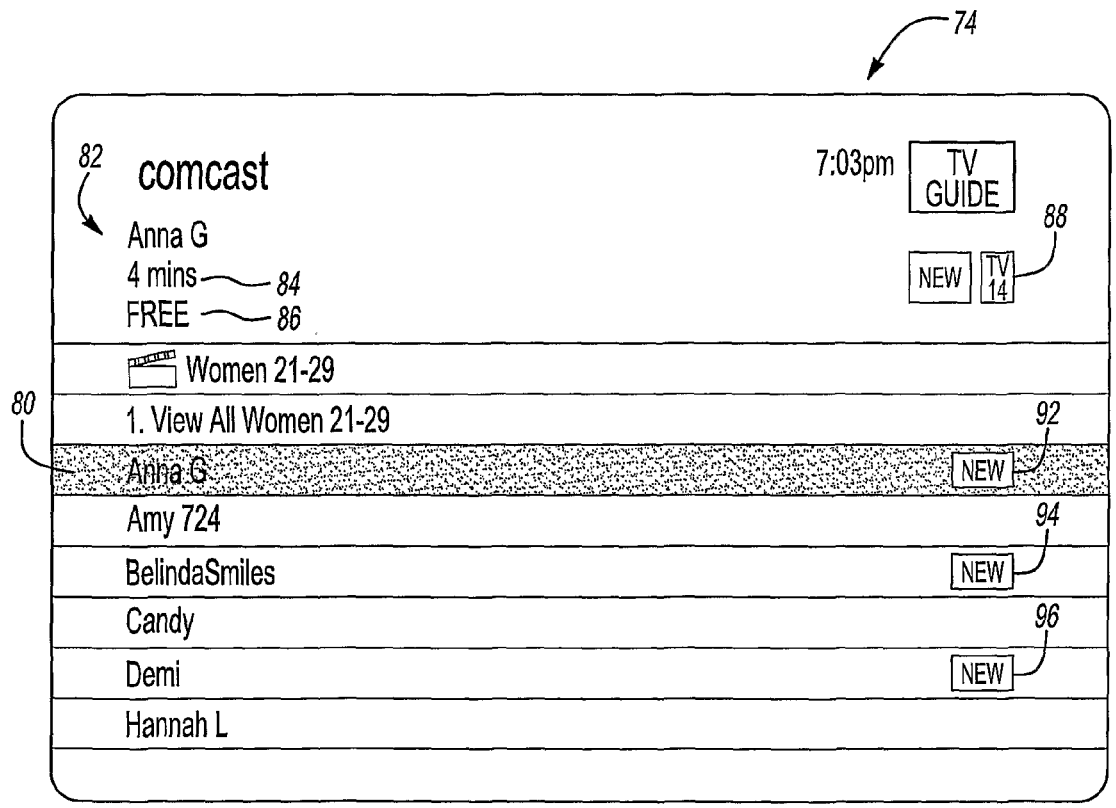
FIG. 4 illustrates a listings menu in accordance with one non-limiting aspect of the present invention.

Referring again to the listing menu of FIG. 4, a subscriber may choose to select a specific video personal from the list, wherein the list can be used to present titles of the videos in a random order or can be sorted by the system based upon new profiles (indicated as shown) or any other criteria. A highlighter 80 or user navigable feature may include to highlight one or more of the listed titles. Optionally, secondary information 82 associated with the highlighted title may be displayed. The secondary information may include any number of features associated with the highlighted title, including a running length 84 of the video personal, a cost 86 for viewing the video personal, and/or a rating 88 associated with the video personal.

Furthermore, the listings menu 74 may include new indicators 92-96 for indicating whether the video associated therewith is new. Videos may be determine to be new if added since the last time the user accessed the menu 74 and/or if the user has not accessed the video personal associated therewith, such as to indicate whether the video is new in so far as it having been previously viewed by the user.

Figure 5:
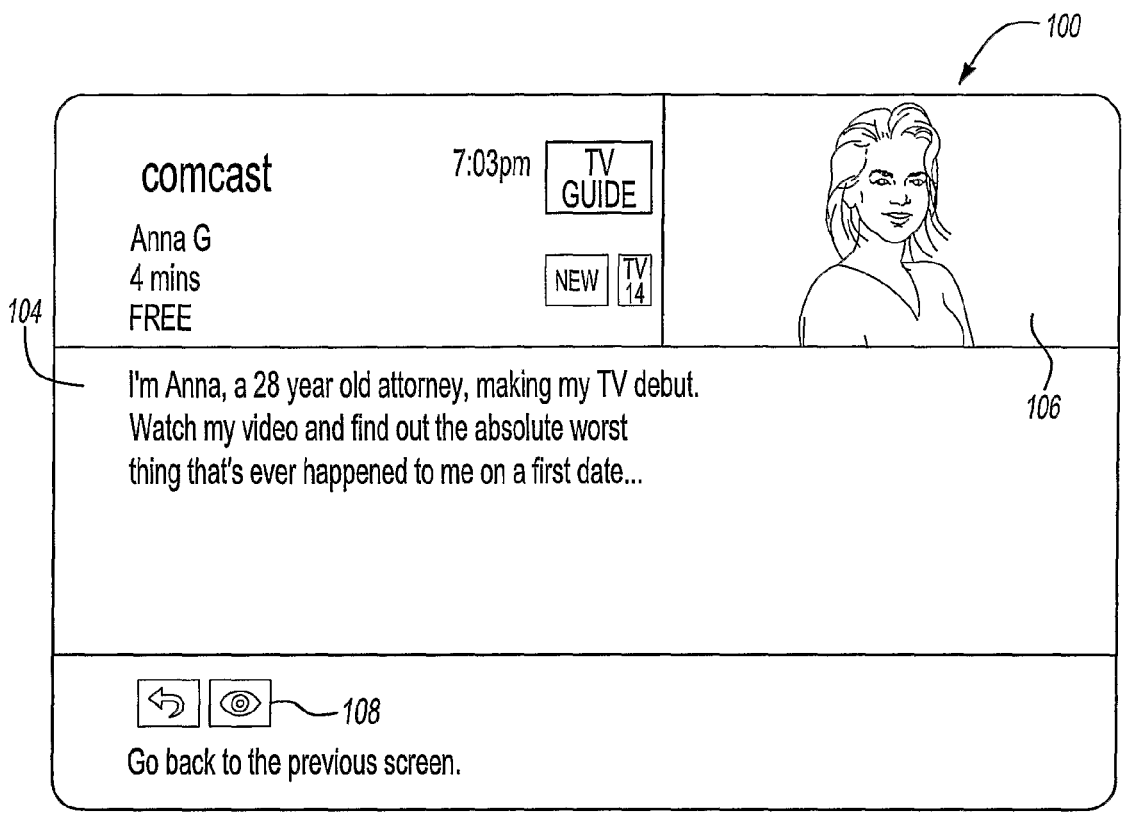
FIG. 5 illustrates a description menu in accordance with one non-limiting aspect of the present invention.
Figure 6:
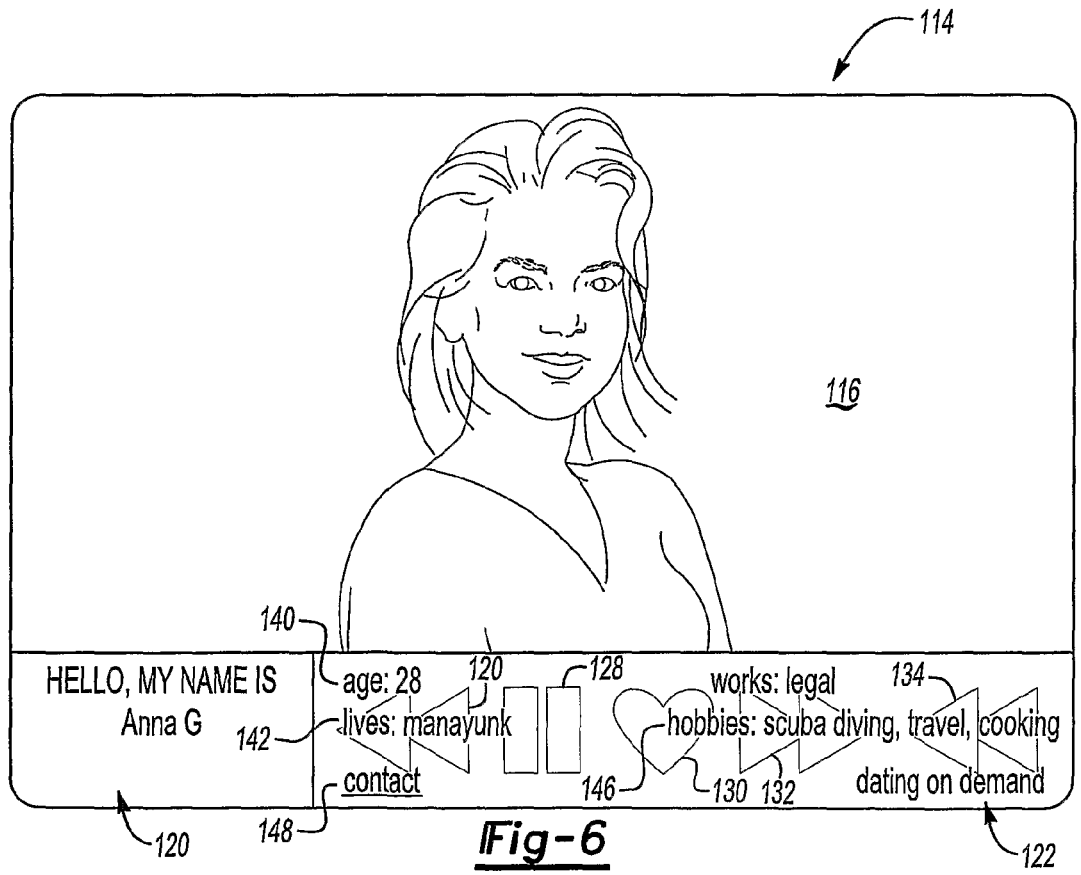
FIG. 6 illustrates a video personals menu in accordance with one non-limiting aspect of the present invention.

If a subscriber selects a particular video personal, for example "Anna G" as shown, a description screen 100 for the associated individual be displayed, such as that shown in FIG. 5. The description screen 100 can include textual information 104 about the participant, a photograph 106 of the participant, and a button 108 to access a video personals menu for playing, pausing, fast-forwarding, and rewinding of her video personal (not shown), such as a video personals menu 114 shown in FIG. 6.

The video personals menu 114 may include a relatively large viewing portion 116 for displaying the video during playback. A name field 120 may be include for displaying the name associated with the video personal. A combination navigation, control and display menu 122 may be provided to provide features to assist in playing the video and contacting the individual associate therewith.

For example, the menu 122 may include playback control buttons, such as a rewind, pause, play, fast-forward, and skip buttons 120-134, respectively, to facilitate controlling playback of the video personal. A cursor or other feature may be positioned over these buttons and selected to engage the operation associated therewith. Likewise, the buttons 120-134 may cooperate with similar features on the remote control such that the buttons light-up or otherwise indicate the particular control feature being activated by user selection of the corresponding remote control feature.

The menu 114 may include an age field 140, lives field 142, a works field 144, a hobbies field 146, and a contact button 148. The fields 140-146 may be populated with textual information provided by the individual associated with the video. The contact button 148 may be selected to contact the individual associated with the video, such as through email or access to a webpage. Activation of the contact button 148 may prompt the STBs 28-30 to display an email interface, webpage, or other features associated with sending a message or learning more about the individual in the video.

With further reference to FIG. 3, another option available to the subscriber may be to "View All Women" category 64, such that all the video personals of the women in this category are strung together and played in succession, without the subscriber having to select and play each video personal one by one. Of course, as described above, groups of video personals can be defined according to categories other than age groupings.

Referring again to FIG. 3, "The Singles Scene" option 62 could house additional entertaining segments related to dating in general or the filming of the video personals. Video offerings could include "behind the scenes" type footage at the meet and greet events, outtakes and bloopers, dating insights from other individuals at attendance at the events, or the like. This menu could also include information screens about the "Dating on Demand" service itself.

By utilizing VCR-like functionality (e.g., pause, rewind, fast forward, etc.), this will make the viewing experience more efficient for those people that wish to quickly skip to those personals in which they have more interest. As described above with respect to the title list, search criteria could be used to dictate the order in which the video personals are assembled and played.

Furthermore, the system 10 and method of the present invention could allow a subscriber to select a particular portion of each video personal that he/she wishes to watch, such as each participant's answer to a particular question. The system could then be configured to skip to the pertinent portion of each video personal to allow the subscriber to view the portion of each video personal in which he/she was interested in an efficient manner.

According to the present invention, subscribers could "flag" the video personals of people that they are interested in and save them to a favorites list within the VOD system. Additionally, subscribers could have the opportunity to vote for their favorite profile and see the "Top10" most watched profiles. Still further, viewers could vote for the "most eligible" man and woman, and these candidates could then have their profiles posted nationally.

If a subscriber is interested in contacting a participant featured in a particular video personal, the system can provide the capability for the subscriber to send an e-mail to the participant via the television. Alternatively, the subscriber could be directed to a website (such as that of the service provider) in order to send an e-mail to the participant.

Viewing of video personals and related content could be provided for free to any VOD subscribers, or alternatively could be a premium service beyond standard VOD service. In one approach, participants would pay the service provider for the right to have their video personal filmed and placed on the VOD servers. Advertisements can be displayed by the service provider in association with the video personal and dating content.

The dating system 10 and method according to the present invention brings the local dating and online dating experience to the television environment via video on demand. The present invention serves as a unique means for people to meet and find out more about each other, providing a video introduction which allows the "first date" to take place before two people ever meet.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of providing video on demand (VOD) dating, the method comprising:
   storing video personals on a subscription television VOD server;
   determining a television subscriber demanding viewing of one or more of the video personals;
   selectively transmitting signals associated with the one or more demanded video personals to the demanding subscriber such that the one or more demanded video personals are viewable by the demanding subscriber to facilitate VOD dating; providing the television subscriber with an interactive option to respond to one of the demanded video personals by using the subscription television system to prepare an electronic message on behalf of the subscriber;
   providing a VOD dating menu to facilitate demanding the video personals;
   including a number of selectable categories within the VOD dating menu, each of the selectable categories being selectable for on demand viewing of video personals associated with therewith; and
   including a singles scene category within the VOD dating menu, wherein the singles scene category comprises an option for viewing out-takes or behind-the-scenes footage from previously recorded video personals.

2. The method of claim 1 further comprising configuring the singles scene category for viewing video associated VOD dating in general.

3. A method of providing video on demand (VOD), comprising:
- storing a number of video personals on a VOD server; providing a VOD dating menu to facilitate demanding the video personals, wherein the dating menu includes a number of selectable categories within the VOD dating menu, each of the selectable categories being selectable for on demand viewing of video personals associated therewith, wherein one of the number of selectable categories comprises including a singles scene category within the VOD dating menu, wherein the singles scene category comprises an option for viewing out-takes or behind-the-scenes footage from previously recorded video personals; determining a subscriber demanding viewing of one or more of the video personals or selectable categories; and
- selectively transmitting signals associated with the one or more demanded video personals or selectable categories to the demanding subscriber such that the one or more demanded video personals are viewable by the demanding subscriber to facilitate VOD dating.

4. A method of providing video on demand (VOD) dating, the method comprising:
- storing video personals on a subscription television VOD server;
- determining a television subscriber demanding viewing of one or more of the video personals;
- selectively transmitting signals associated with the one or more demanded video personals to the demanding subscriber such that the one or more demanded video personals are viewable by the demanding subscriber to facilitate VOD dating;
- providing the television subscriber with an interactive option to respond to one of the demanded video personals by using the subscription television system to prepare an electronic message on behalf of the subscriber; and
- automatically skipping to a predetermined portion of each of the demanded video personals during playback for the subscriber, wherein the predetermined portion of each of the demanded video personals contains each corresponding individual's response to a predetermined question.

5. The method of claim 3, wherein the VOD dating menu further includes a listing of personals videos ranked according to votes received from a plurality of subscribers.

6. The method of claim 3, further comprising offering the subscriber an option to generate an email to an individual appearing in a personals video using a television.

7. The method of claim 3, wherein the option for viewing is an option for viewing out-takes from a meet and greet event.

8. The method of claim 7, further comprising offering the subscriber an option to view comments received from other individuals who attended the meet and greet event.

* * * * *